United States Patent
Sonar et al.

(10) Patent No.: US 10,331,599 B2
(45) Date of Patent: Jun. 25, 2019

(54) EMPLOYING SESSION LEVEL RESTRICTIONS TO LIMIT ACCESS TO A REDIRECTED INTERFACE OF A COMPOSITE DEVICE

(71) Applicant: Dell Products L.P., Round Rock, TX (US)

(72) Inventors: Gautam Sonar, Bangalore (IN); Azeez Ahmed, Bangalore (IN); Deepthi Chavan, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 343 days.

(21) Appl. No.: 15/067,565

(22) Filed: Mar. 11, 2016

(65) Prior Publication Data
US 2017/0264649 A1 Sep. 14, 2017

(51) Int. Cl.
| | |
|---|---|
| G06F 13/38 | (2006.01) |
| G06F 13/42 | (2006.01) |
| G06F 21/62 | (2013.01) |
| G06F 21/82 | (2013.01) |
| H04L 29/08 | (2006.01) |
| G06F 9/4401 | (2018.01) |
| H04L 29/06 | (2006.01) |
| G06F 9/451 | (2018.01) |

(52) U.S. Cl.
CPC .......... *G06F 13/387* (2013.01); *G06F 9/4411* (2013.01); *G06F 9/452* (2018.02); *G06F 13/4282* (2013.01); *G06F 21/6281* (2013.01); *G06F 21/82* (2013.01); *H04L 63/10* (2013.01); *H04L 67/141* (2013.01); *H04L 67/38* (2013.01); *H04L 69/30* (2013.01); *H04L 63/20* (2013.01); *H04L 67/08* (2013.01); *H04L 67/2814* (2013.01)

(58) Field of Classification Search
CPC ..... H04L 65/1069; H04L 47/20; H04L 63/10; H04L 67/141; H04L 67/38; H04L 69/30; H04L 63/20; H04L 67/08; H04L 67/2814; G06F 13/4282; G06F 13/387; G06F 9/452; G06F 9/4411; G06F 21/6281; G06F 21/82
See application file for complete search history.

(56) References Cited

U.S. PATENT DOCUMENTS

| | | | | |
|---|---|---|---|---|
| 8,332,846 | B2 * | 12/2012 | Astrand | G06F 9/45537 710/72 |
| 9,507,615 | B2 * | 11/2016 | McKenzie | G06F 21/83 |
| 2009/0210927 | A1 * | 8/2009 | Mokuya | H04L 9/3226 726/3 |
| 2016/0036818 | A1 * | 2/2016 | Patesaria | H04L 63/102 726/3 |

* cited by examiner

*Primary Examiner* — Tonia L Dollinger
*Assistant Examiner* — Albert Chiou
(74) *Attorney, Agent, or Firm* — Kirton McConkie; Brian Tucker

(57) ABSTRACT

Session level restrictions can be implemented to limit access to a redirected interface of a composite device. These session level restrictions can be defined within a policy of a directory service, such as Active Directory, to facilitate the dynamic application of the restrictions to the appropriate remote sessions. In this way, access restrictions can be applied to individual interfaces of a redirected composite device so that a particular interface will only be accessible from specified remote sessions.

20 Claims, 10 Drawing Sheets

EMPLOYING SESSION LEVEL RESTRICTIONS TO LIMIT ACCESS TO A REDIRECTED INTERFACE OF A COMPOSITE DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1, 2A and 2B and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands Together, these aspects allow the user at client 102 to locally view and input commands to the desktop and/or application that is running remotely on server 104. From the perspective of the client side, the desktop running on server 104 may represent a virtual desktop environment.

FIG. 2A is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2A. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The Object Manager Namespace (OMN) stores information on symbolic links created for use by operating system 170, including symbolic links for devices and for applications running on server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on server 104; various "Local" namespaces, each associated with a user session running on server 104, used to store information for applications used by (and restricted to) the associated user session; and a "Device" namespace used to store device object names of devices and virtual devices accessible by server 104. A "Global" namespace may be referred to as a global namespace. A "Local" namespace may be referred to as a local namespace. A "Device" namespace may be referred to as a device namespace.

As described herein, symbolic links can be stored in a global namespace or a local namespace. Symbolic links stored in a global namespace may be available to the entire system (i.e., to all user sessions running on server 104), while symbolic links stored in a local namespace may only be seen and accessed by the session for which they are created. For example, "\\GLOBAL??\c:" may be a symbolic link stored in a global namespace. "\Device\HarddiskVolume1" may be a device object name stored in a device namespace. A symbolic link "\\GLOBAL??\c:" may be pointing to a device object having a device object name of "\Device\HarddiskVolume1". Because "c:" is a symbolic link in the global namespace directory, such a symbolic link may be accessed by the entire system, including all the users logged in through their respective user sessions. A user application can open "\\GLOBAL??\c:" or just "c:" to access the actual device.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any user session running on server 104. As a result, the device 240 associated with the symbolic link can be accessed from any user session on server 104, and/or from any client terminal having an active user session on server 104.

FIG. 2B illustratively shows a block diagram of a computer system 100 providing local device virtualization. As previously described in relation to FIG. 1, system 100 includes client terminals 102a-102n communicating through network 106 with server 104. As described in relation to FIG. 2A above, each device 240a, 240b can be virtualized on server 104 to provide access to the device from a user session on server 104 through a corresponding virtual device 290a, 290b. For example, when device 240a is connected to client terminal 102a, drivers for device 240a may be loaded in operating system 170 of server 104, device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on server 104. For example, as illustratively shown in FIG. 2B, a user of client terminal 102a having a user session on server 104 may access both device 240a as well as virtual device 240b' from the user session. Similarly, a user of client terminal 102b having a user session on server 104 may access both device 240b as well as virtual device 240a' from the user session. Finally, a user of client terminal 102c having a user session on server 104 may access both virtual device 240a' and 240b' from the user session.

Hence, the device virtualization described in relation to FIGS. 2A and 2B provides unrestricted access to devices 240 connected locally to client terminals 102 from any user session on server 104. As such, a redirected device becomes a local device to the server and can be accessed by all the users' sessions connected to that server. For example a printer or a mass storage device, when redirected by one user connected through a session on the server, will show up as a local device and all the users can read/write the mass storage device and print using the printer.

While the unrestricted access enables users of client terminals 102 to share access to and use of devices 240, the device virtualization does not permit a user to restrict access to a device 240. In this respect, the unrestricted device virtualization does not permit secure or private access to device 240. The device virtualization thus presents security and privacy concerns, as a device 240 may be accessed or used by any number of unauthorized users having user sessions on server 104. In order to address these security and privacy concerns, a device virtualization system may require that a device connected through a session only be accessible in that session.

FIG. 3A is a block diagram of a system 300 that can be employed to enforce session level restrictions to limit access to a redirected interface of a USB composite device. The system 300 may include a client 102 in communication with a server 304 over network 106 such as is depicted in FIG. 1. Client 102, including proxy 210, stub driver 220, bus driver 230, and one or more optional device(s) 240, is substantially similar to the client 102 shown in and described in relation to FIG. 2A. Server 304 includes agent 250, virtual bus driver 260, device stack 280 including device objects 281a, 281b, . . . , 281n, device drivers 282a, 282b, . . . , 282n, operating system 170, application 270, and one or more optional virtualized device(s) 290, which function substantially similarly to the corresponding elements of server 104 of FIG. 2A.

Server 304 additionally includes a Device Access Restriction object (DAR object) 180 at the top of device stack 280. A Device Access Restriction driver (DAR driver) 182 creates and attaches DAR object 180 at the top of device stack 280. DAR driver 182 is registered with operating system 170 as the upper filter driver for all selected class(es) of devices for which access restriction is to be made. When DAR driver 182 determines that a device of the class for which the DAR driver is registered is redirected to server 304, the DAR driver creates DAR object 180 and attaches the DAR object at the top of device stack 280.

Server 304 functions substantially similarly to server 104 in terms of loading drivers and device objects for device 240 on server 304. However, as discussed above, DAR driver 182 is registered as the upper filter driver for all the selected class(es) of devices for which access restriction is to be provided. For example, an image device class which includes webcams may be predetermined to be provided with access restriction. Such device classes may be predetermined by a user. When a device of the class, for which DAR driver 182 is registered, is plugged in, the DAR driver will be loaded and its add device routine may be called by operating system 170. For example, in cases where operating system 170 is a Windows system, a plug-and-play (PNP) component of the Windows Kernel will call an add device routine of DAR driver 182. Inside the add device routine, DAR driver 182 receives the physical device object of device stack 280 as an argument, which is used to verify that the device is a device redirected from client 102 using virtual bus driver 260. This verification is done by traversing device stack 280 downward until the bottom of the stack is reached or virtual bus driver 260 is found.

If virtual bus driver 260 is found in device stack 280, this signifies that the device is redirected from client 102 using the virtual bus driver. If the device is found to be redirected from client 102, DAR driver 182 creates DAR object 180 and attaches it (as the top object) onto device stack 280. However, if the bottom of device stack 280 is reached and virtual bus driver 260 is not found, this signifies that the device stack is not a device that is redirected from client 102, and thus no access restriction is to be provided. If the device is not found to be redirected, then DAR object 180 will not be attached on top of the device stack 280.

Since DAR object 180 is attached to the top of device stack 280, all requests for the redirected device are first received by DAR object 180. Thus, DAR object 180 can accept or reject the requests. For example, DAR object 180 can thus restrict a redirected device to be only accessible from the user session (e.g., a Microsoft windows terminal server session) it is redirected from such as is described in U.S. Pat. No. 8,990,394 (the '394 patent).

Although the techniques described in the '394 patent provide some flexibility as to whether a redirected device will be accessible outside of the redirecting user's session, the techniques do not allow restrictions to be applied dynamically on a per session basis. In the case of a redirected composite device, the techniques of the '394 patent would similarly not provide a way to limit access to individual interfaces of the composite device. More specifically, the '394 patent does not provide a way limit access to an individual interface of a composite device to only specified users. In contrast, using the techniques of the '394 patent, a user can only specify whether the entire composite device will be accessible outside of the redirecting user's session.

BRIEF SUMMARY

The present invention extends to methods, systems, and computer program products for employing session level restrictions to limit access to a redirected interface of a composite device. These session level restrictions can be defined within a policy of a directory service, such as Active Directory, to facilitate the dynamic application of the restrictions to the appropriate remote sessions. In this way, the present invention can facilitate the enforcement of access restrictions to individual interfaces of a redirected composite device so that a particular interface will only be accessible from specified remote sessions.

In one embodiment, the present invention is implemented by a server with which a number of client terminals establish remote sessions. The server can perform a method for controlling from which remote sessions a redirected USB interface will be accessible. In response to a first USB interface being redirected from a first client terminal to the server over a first remote session, a first device access restriction object can be created in a first device stack that governs access to the first redirected USB interface on the server. The first device access restriction object identifies remote sessions from which the first redirected USB interface is accessible. A request is received from a second client terminal to establish a second remote session with the server. In conjunction with establishing the second remote session, one or more policies that are applicable to the second remote session can be identified. The one or more policies can include a policy setting which defines that the first redirected USB interface should be accessible. The first device access restriction object can then be updated to include an identifier of the second remote session thereby causing the first redirected USB interface to be accessible from the second remote session.

In another embodiment, the present invention can be implemented as a server that is configured to establish remote sessions with a number of client terminals. The server can include a USB device stack for controlling access to a USB interface that is associated with a first class code, and a virtual bus driver and an agent for enabling a USB interface to be redirected from one of the client terminals to the server. The server can be configured to add a device access restriction object to the USB device stack when a USB interface associated with the first class code is redirected to the server. The server can be further configured to update the device access restriction object to include an identifier of a remote session when the remote session is governed by a policy that includes a policy setting that enables access to a redirected USB interface associated with the first class code.

In another embodiment, the present invention is implemented as computer storage media storing computer executable instructions which when executed on a server implement a method for controlling from which remote sessions a redirected USB interface will be accessible. The method can include: detecting that a composite USB device has been connected to a client terminal that has established a remote session with the server; redirecting each interface of the composite USB device to the server including creating a device access restriction object in a device stack created for each of the interfaces, each device access restriction object being configured to allow access to the corresponding redirected interface from remote sessions that are identified within the device access restriction object; and in response to another client terminal establishing another remote session with the server and based on a policy setting of a policy applicable to the other remote session, updating at least one of the device access restriction objects to include an identifier of the remote session established with the other client terminal thereby allowing the corresponding redirected interface to be accessed from the other remote session in accordance with the policy setting.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 3:
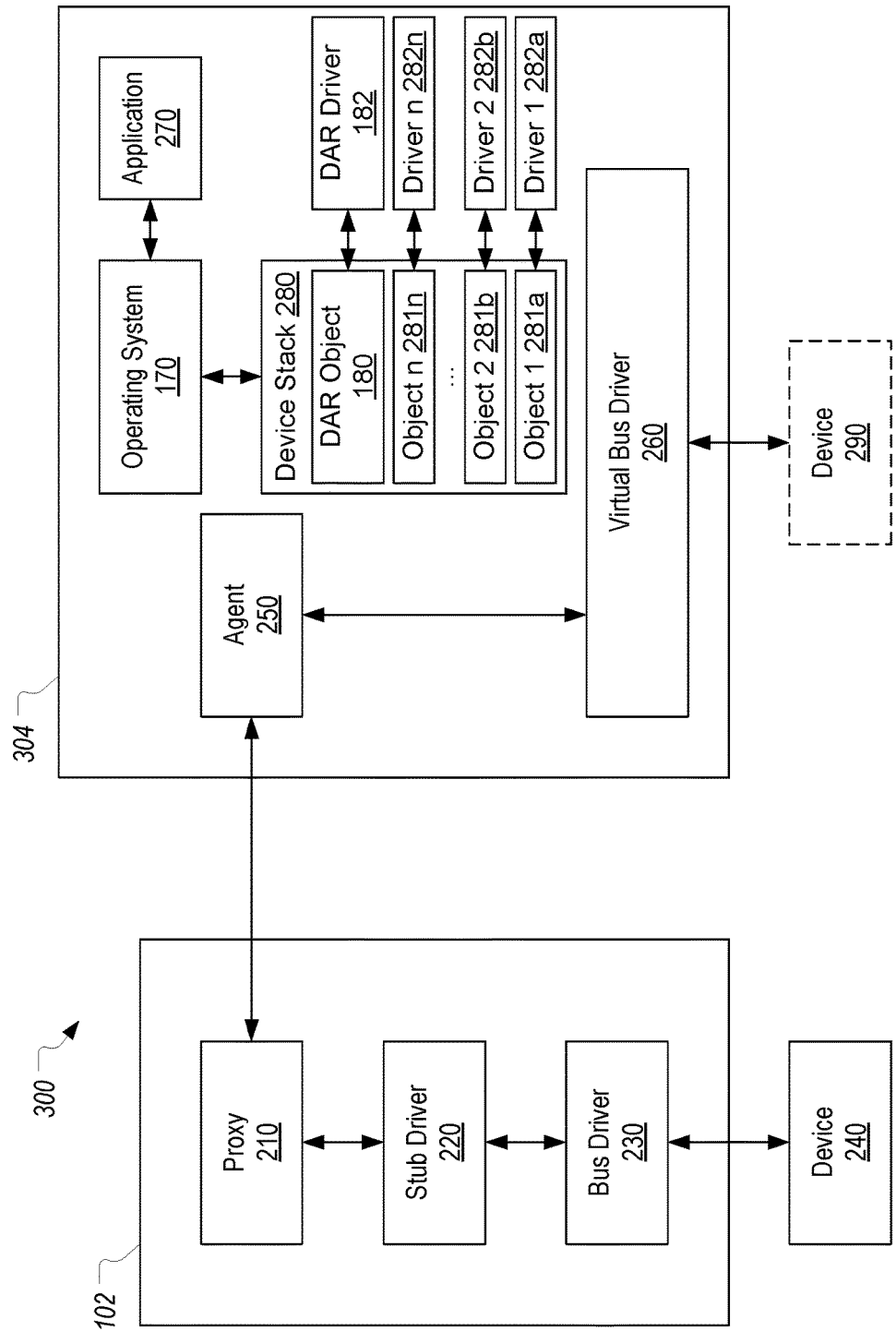
FIG. 3 illustrates how access to a redirected USB device can be restricted to the session over which the redirection occurs.
Figure 4:
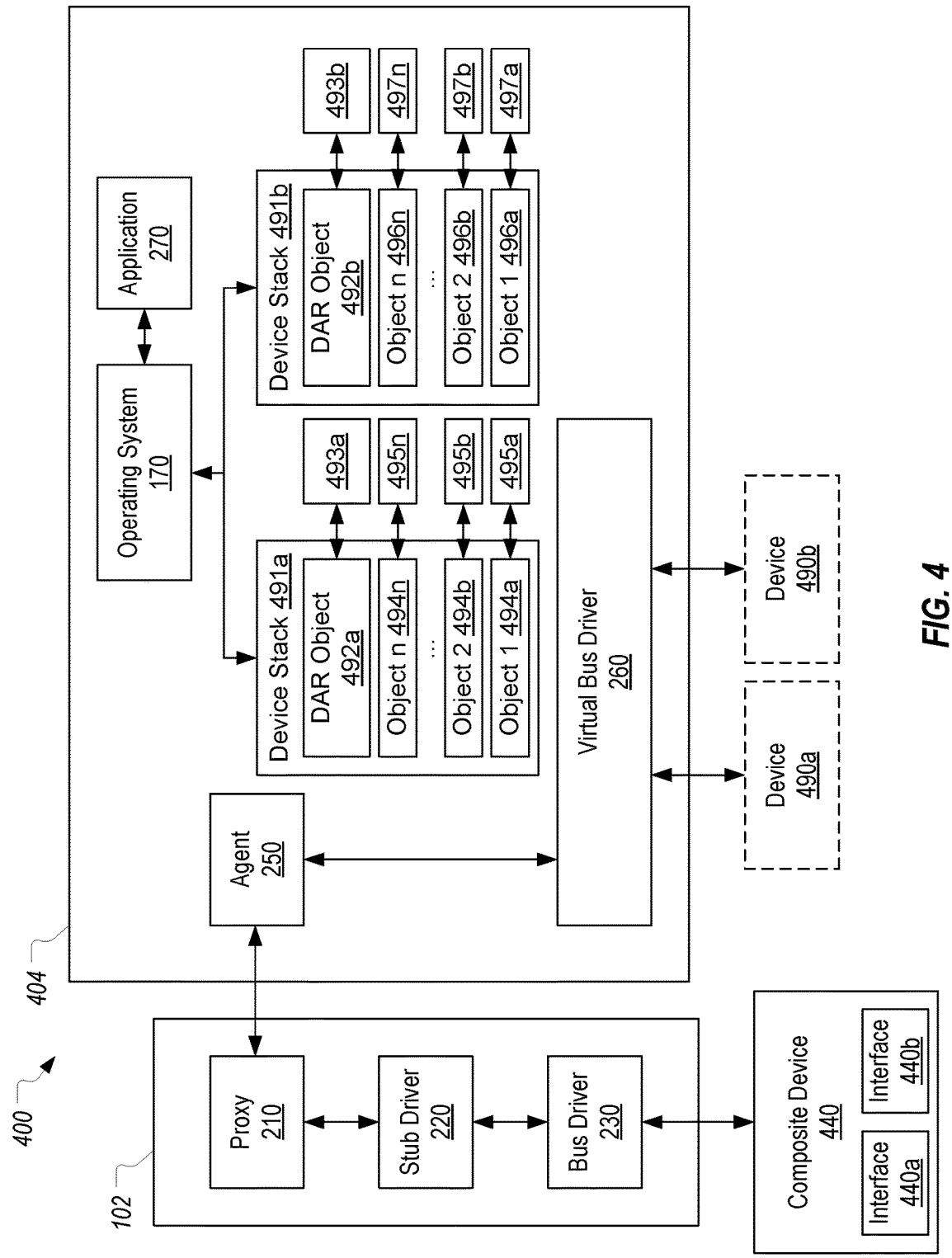
FIG. 4 illustrates how two interfaces of a composite USB device can be redirected to the server.

FIG. 4 illustrates a system 400 in which the present invention can be implemented. System 400 is substantially the same as system 300 described in FIG. 3. However, unlike in FIG. 3, FIG. 4 depicts a scenario in which a USB composite device 440 is connected to a client terminal 102 and redirected to server 404. As is known in the art, a composite device is one that includes more than one interface. For example, a composite device may be a USB device that includes both printing and scanning functionality. In FIG. 4, it will be assumed that composite device 440 includes two interfaces—a printer interface 440a and a scanner interface 440b. However, a composite device could include any reasonable number and type of interfaces.

Figure 1:
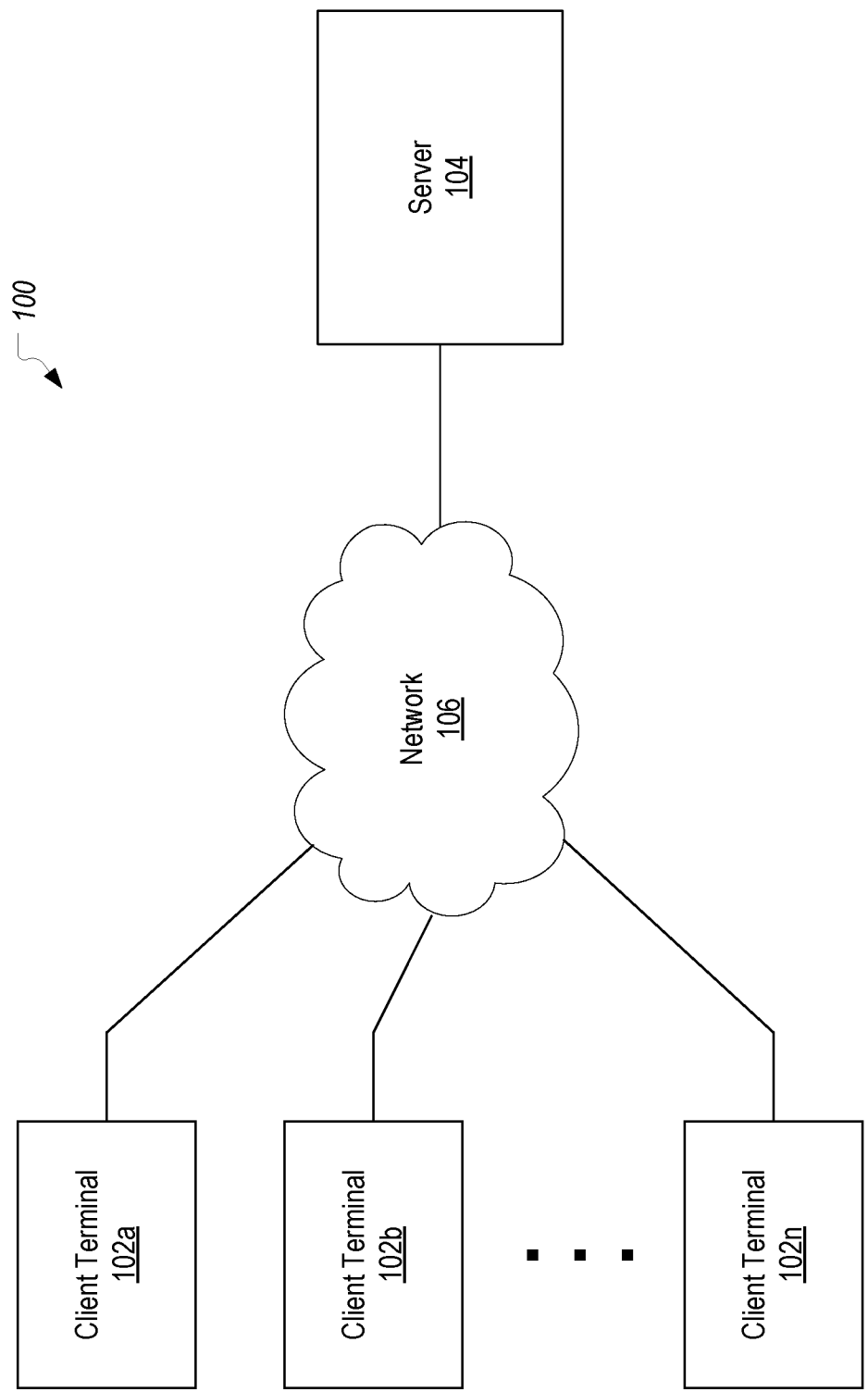
FIG. 1 illustrates an example computing environment in which the present invention can be implemented.
Figure 2A:
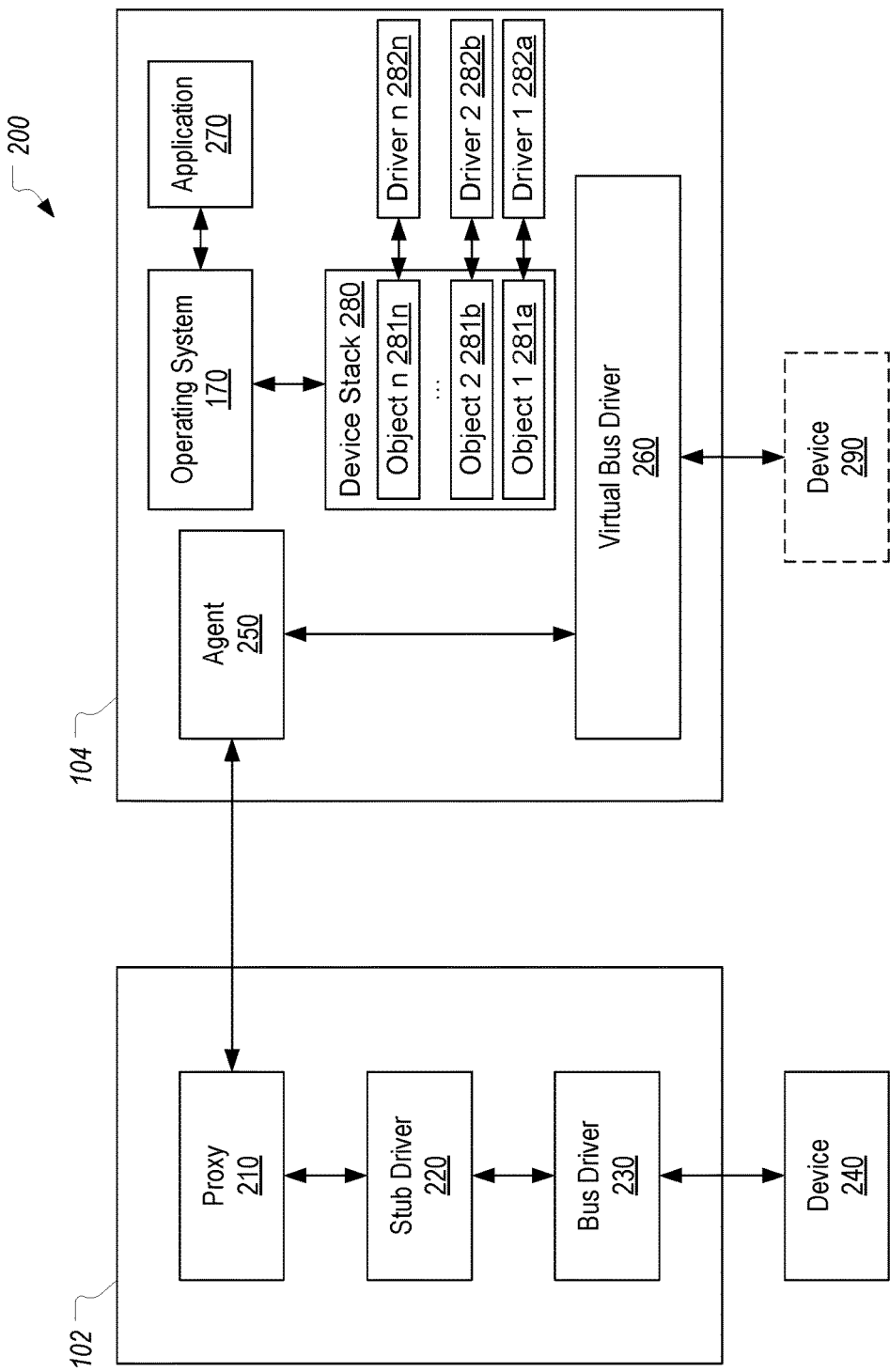
FIG. 2A illustrates how a USB device can be redirected from a client terminal to a server.
Figure 2B:
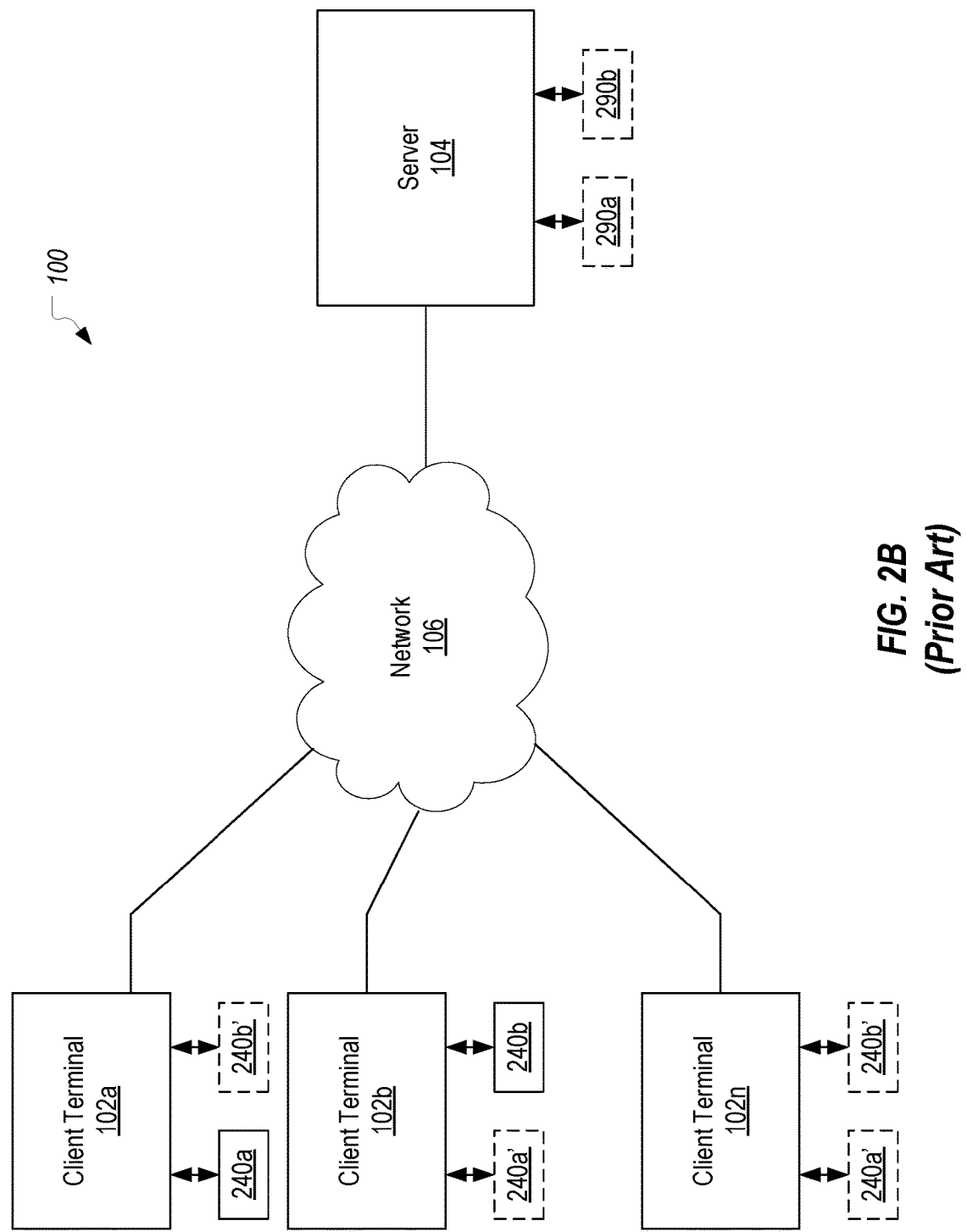
FIG. 2B illustrates how redirecting the USB device to the server can make the device accessible to any remote session established with the server.

For purposes of the present discussion, it can be assumed that a separate device stack is generated for each interface of a composite device in substantially the same manner as described above with reference to FIG. 2A. Therefore, in accordance with USB redirection techniques, when composite device 440 is connected to client terminal 102, two separate device stacks 491a, 491b can be created on server 404 corresponding to printer interface 440a and scanner interface 440b respectively. As described in the Background, device stack 491a can include a number of device objects (e.g., objects 494a-494n) which are associated with the corresponding drivers 495a-495n. Similarly, device stack 491b can include a number of device objects (e.g., objects 496a-496n) which are associated with the corresponding drivers 497a-497n. The result of creating device stacks 491a, 491b on server 404 is that virtual devices 490a, 490b corresponding to interfaces 440a, 440b respectively will appear as if they were connected directly to server 404.

As is also described in the Background, a DAR driver 493a that is registered for the class of devices to which device 490a pertains (e.g., a DAR driver for printer devices) is loaded and creates DAR object 492a. Similarly, a DAR driver 493b that is registered for the class of devices to which device 490b pertains (e.g., a DAR driver for image devices) is loaded and creates DAR object 492b.

In accordance with embodiments of the present invention, DAR objects 492a, 492b can be dynamically updated based on one or more applicable policies of a directory service (e.g., Active Directory) to control from which user sessions devices 490a, 490b will be accessible. More specifically, whenever a user establishes a session with server 404, one or more policies applicable to the user can be processed to determine whether any DAR object should be updated to allow the user to access a corresponding class of USB device from within the session. In this way, only specified users will be allowed to access a redirected device from within a session even if the redirected device is an individual interface of a composite device. The present invention therefore provides greater control over how a redirected composite device will be accessible to other users.

Figure 5:
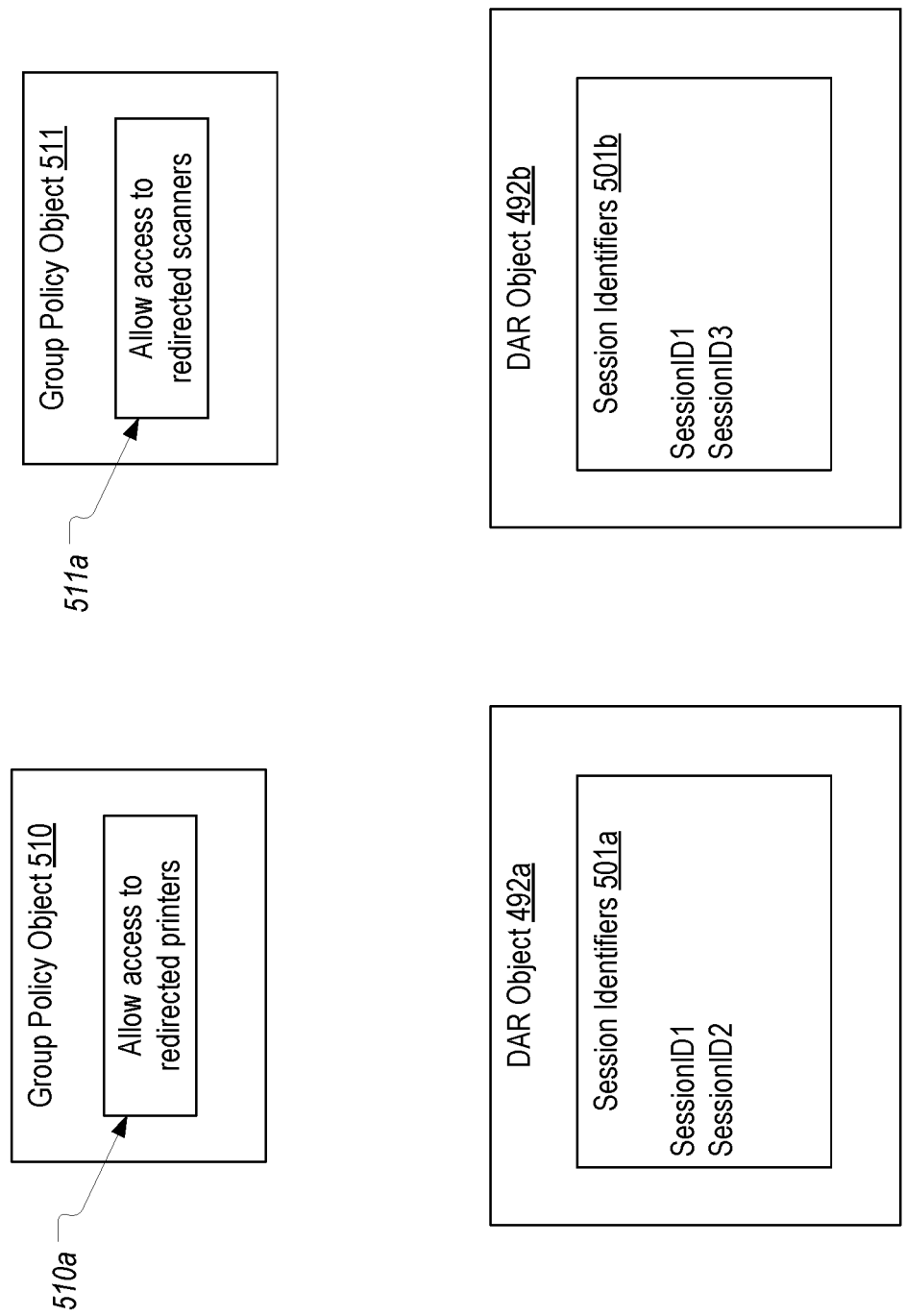
FIG. 5 illustrates an example of how a device access restriction object can be updated to include identifiers of remote sessions that are allowed access to the corresponding redirected interface based a policy setting defined in a group policy object applicable to the remote sessions.

FIG. 5 depicts an example of how DAR objects 492a, 492b may each maintain a list 501a, 501b respectively of session identifiers. Each user session established with server 404 can be associated with an identifier. Therefore, each of DAR objects 492a, 492b can be dynamically updated so that its list 501a, 501b of session identifiers can reflect which sessions should be granted access to the corresponding device(s). As is also represented in FIG. 5, which session identifiers are added to a DAR object can be controlled using a policy object of a directory service such as a group policy object of Active Directory.

In FIG. 5, two example group policy objects 510, 511 are shown. Group policy object 510 includes a policy setting 510a which indicates that a user to which the group policy object applies should be allowed to access redirected printers. In contrast, group policy object 511 includes a policy setting 511a which indicates that a user to which the group policy object applies should be allowed to access redirected scanners. Of course, a group policy object could be defined to include any number of policy settings including policy settings that would allow access to both redirected printers and scanners.

In some embodiments of the present invention, a group policy object can define policy settings that are specific to USB devices/interfaces having a particular class code (or equally a particular subclass and/or protocol). For example, USB printers have a class code of 07h, and therefore, policy setting 510a could specify that access should be allowed to any redirected device having a class code of 07h. In short, the policy setting can be defined in a way that allows it to be mapped to a particular DAR object that governs access to a USB device having the corresponding class, subclass, and/or protocol.

In FIG. 5, list 501a is shown as including two session identifiers: SessionID1 and SessionID2; whereas list 501b is shown as including two session identifiers: SessionID1 and SessionID3. Accordingly, in this example and as will be further described below, DAR object 492a can allow access to virtual device 490a (or more specifically to interface 440a of composite device 440) from within the sessions having identifiers SessionID1 and SessionID2. Similarly, DAR object 492b can allow access to virtual device 490b (or more specifically to interface 440b of composite device 440) from within the sessions having identifiers SessionID1 and SessionID3. In contrast, any session having a session identifier that is not included in the list will not be allowed to access the corresponding virtual device. Further, in some embodiments, the corresponding DAR driver can update the global object manager namespace (OMN) of operating system 170 to prevent the virtual devices from even appearing within sessions that are not granted access to the virtual device in a similar manner as is described in the Background.

FIGS. 6A-6D generally illustrate a process that can be performed to update a DAR object when a user establishes a session with server 404. For this example, it will be assumed that three different users employ three client terminals 102*a*-102*c* to establish sessions with server 404. It will also be assumed that group policy object 510 is applicable to the users of client devices 102*a*, 102*b* and that group policy object 511 is applicable to the user of client device 102*c*.

Figure 6A:
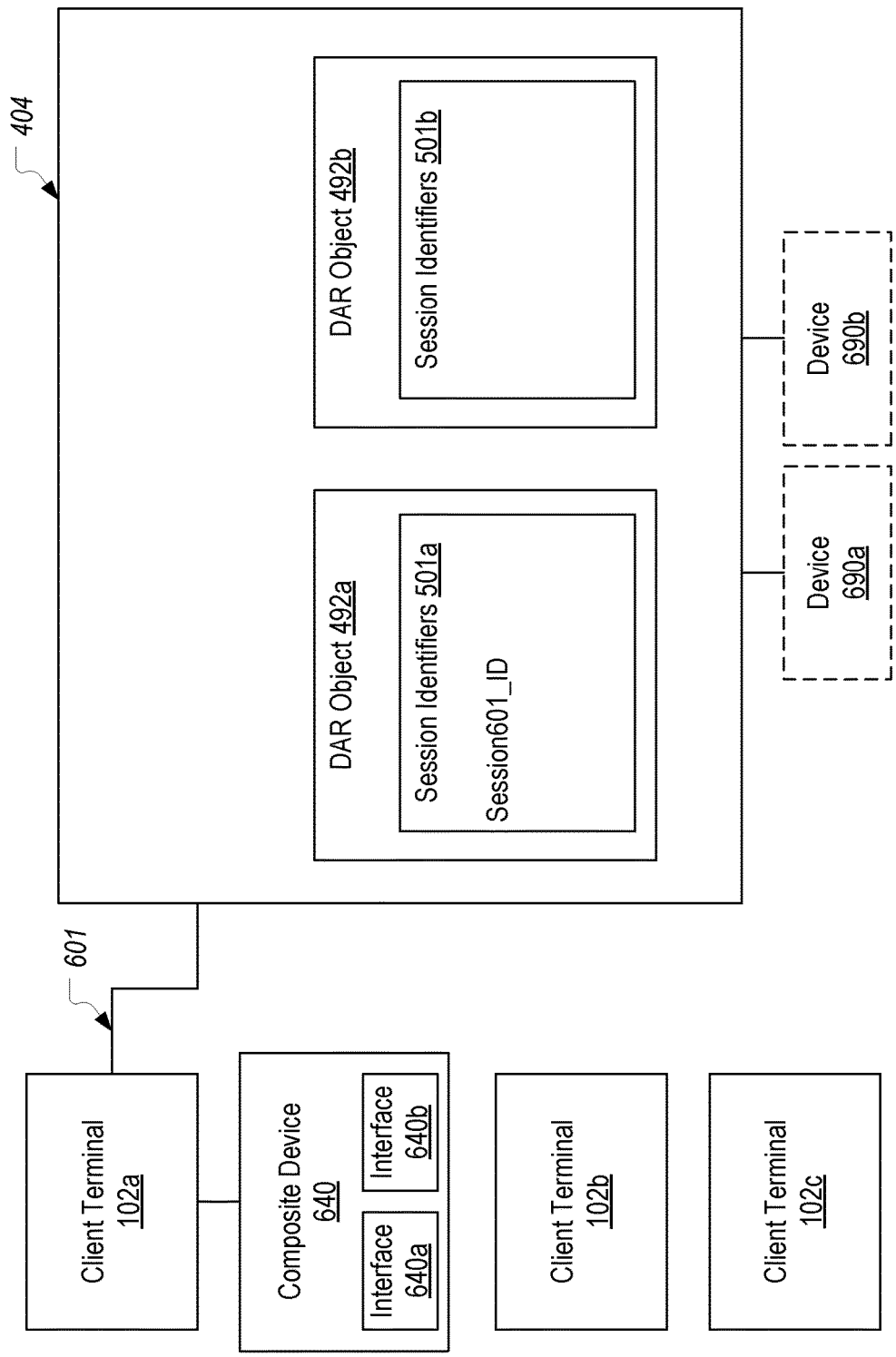
FIGS. 6A-6C depict a process of updating device access restriction objects in accordance with group policy when remote sessions are established.

In FIG. 6A, it is assumed that client terminal 102*a* has already established a session 601 with server 404. A composite device 640 has also been connected to client terminal 102*a* and each interface 640*a*, 640*b* of composite device 640 is being redirected to server 404. Interface 640*a* is assumed to be a printer and interface 640*b* is assumed to be a scanner. Accordingly, virtual device 690*a* corresponding to printer interface 640*a* and virtual device 690*b* corresponding to virtual device 640*b* can appear as if they were connected locally to server 404.

Because client terminal 102*a* is governed by group policy object 510, the policy settings defined within group policy object 510 can be applied when session 601 is established. In this case, the applicable policy setting 510*a* indicates that client terminal 102*a* should be allowed to access redirected printers. Accordingly, the application of group policy object 510 to session 601 will cause session 601's identifier to be added to DAR object 492*a* which is represented in FIG. 6A by the inclusion of "Session601_ID" in list 501*a*. The functionality for making such updates can be implemented in any suitable way. For example, in embodiments that employ Active Directory, a client side extension may be installed on server 404 for implementing the policy settings of applicable group policy objects.

For purposes of this example, it is assumed that client terminal 102*a* is not allowed access to interface 640*b* even though composite device 640 is connected locally to client terminal 102*a*. However, it is equally possible that a policy may exist which would allow all interfaces/devices that are redirected over a session to be accessible from within that same session. If such were the case, "Session601_ID" could also be added to DAR object 492*b* based on the application of policy settings defined within the separate policy. In any case, by employing policies to control which session identifiers are added to a DAR object, the present invention facilitates the management and control of access to redirected devices.

Figure 6B:
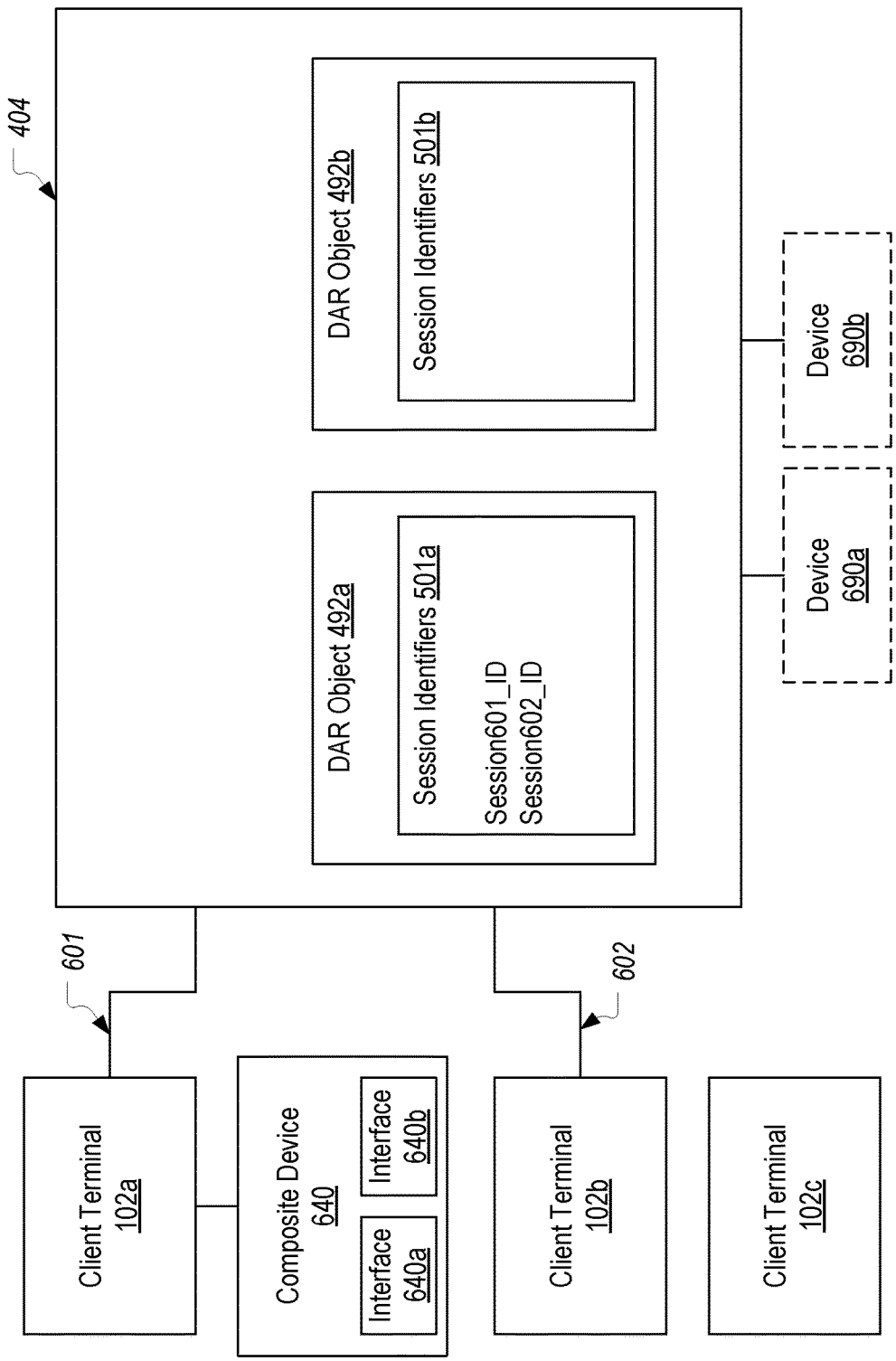

FIG. 6B illustrates that client terminal 102*b* has established a session 602 with server 404. As indicated above, it is assumed that group policy object 510 is applicable to the user of client terminal 102*b*. Therefore, as part of creating session 602, group policy object 510 can be processed to cause the identifier of session 602 to be added to DAR object 492*a* which is represented by the inclusion of "Session602_ID" in list 501*a*. Accordingly, DAR object 492*a*, which governs access to virtual device 690*a*, includes the identifiers of sessions 601, 602 thereby allowing printer interface 640*a* of composite device 640 to be accessed from these sessions.

Figure 6C:
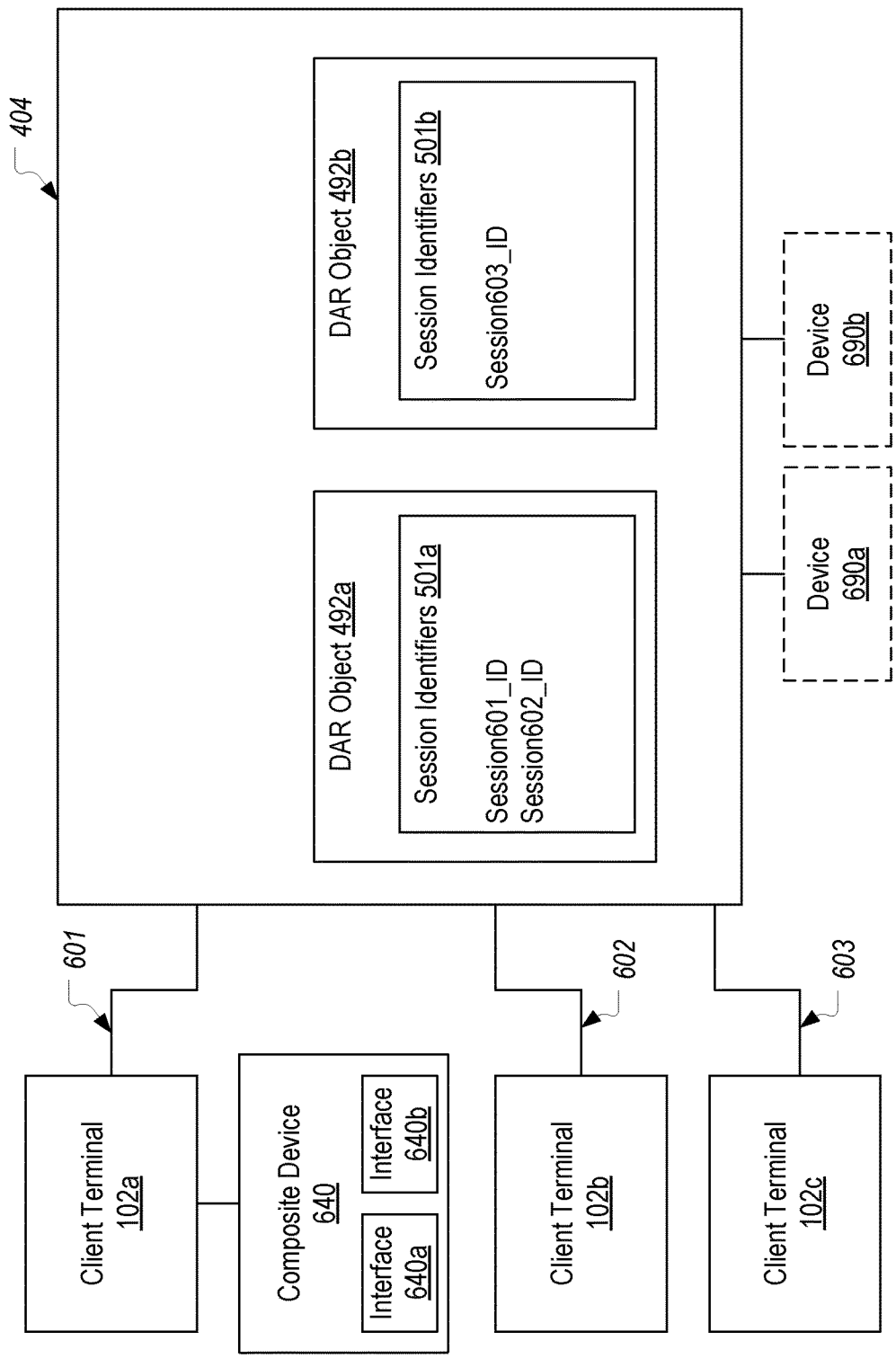

FIG. 6C illustrates that client terminal 102*c* has established a session 603 with server 404. As indicated above, it is assumed that group policy object 511 is applicable to the user of client terminal 102*c*. Therefore, as part of creating session 603, group policy object 511 can be processed to cause the identifier of session 603 to be added to DAR object 492*b* which is represented by the inclusion of "Session603_ID" in list 501*b*. Accordingly, DAR object 492*b*, which governs access to virtual device 690*b*, includes the identifier of session 603 thereby allowing scanner interface 640*b* of composite device 640 to be accessed from this session.

Whenever an attempt to access virtual device 690*a* or virtual device 690*b* is made, the attempt can include the identifier of the session from which the attempt originates. For example, if the user of client terminal 102*a* attempts to print to virtual device 690*a* from a virtual desktop of session 601, the print request can include the identifier Session601_ID. Because DAR object 492*a* sits atop the device stack 491*a*, it will receive this print request and can compare the identifier in the print request to the identifiers in list 501*a*. In this case, since there will be a match, DAR object 492*a* can allow the print request to be fulfilled. In this way, DAR object 492*a* can be employed to selectively allow access to virtual device 690*a* based on policy settings of one or more applicable policies of a directory service.

As indicated in the Background, an object manager namespace of operating system 170 may define symbolic links to each connected device including, in this example, virtual devices 690*a*, 690*b*. In accordance with embodiments of the present invention, in addition to dynamically updating DAR objects 492*a*, 492*b* to include session identifiers of sessions from which access should be allowed to virtual devices 690*a*, 690*b*, the appropriate object manager namespaces may also be updated to prevent virtual devices 690*a*, 690*b* from being visible in sessions that will not be allowed access to the virtual devices.

For example, in the case of FIGS. 6A-6C, the symbolic link to virtual device 690*a* can be removed from (or prevented from being added to) the global object manager namespace and added only to the local object manager namespaces of sessions 601 and 602. Similarly, the symbolic link to virtual device 690*b* can be removed from (or prevented from being added to) the global object manager namespace and added only to the local object manager namespace of session 603. Accordingly, the addition of symbolic links for redirected interfaces of composite devices to local object manager namespaces can be controlled using policy settings of one or more applicable policies of a directory service.

In some embodiments, once a session is terminated, appropriate functionality can be performed to remove the corresponding session identifier from any DAR object. This will ensure that each DAR object includes only the session identifiers of active sessions having access to the corresponding virtual device.

An exemplary benefit of the present invention is that it facilitates the management of an Active Directory domain controller to which a large number of devices may connect. For example, an organization may employ a VDI environment to provide computing resources to its employees (e.g., using thin client devices that connect to a server having a domain controller role in Active Directory). The employees may be grouped into different Active Directory organizational units (or other larger units). An administrator may then define one or more group policy objects for each organizational unit which defines which class of redirected USB devices/interfaces the users within the organizational unit should be allowed to access.

As an example, an accounting department having users that are located in the same area of a building may be grouped into an accounting organizational unit. A group policy object may then be defined governing all users within the accounting organizational unit. This group policy object may include a policy setting stating that users within the accounting organizational unit should be allowed to access a redirected printer interface of a composite device. A composite device including a printer could then be connected to any of the thin client devices employed by the users in the accounting department (thereby causing the printer to be located near each user). Using the techniques of the present invention, the group policy object for the accounting organizational unit would ensure that each user in the accounting department would be able to print to the printer interface of the composite device. If, for whatever reason, it was desired to prevent the accounting department from accessing a scanner interface of the composite device, the group policy object could include a policy setting that would implement the restriction (whether by including a positive restriction or failing to include a permission to access USB devices/interfaces having an image class code).

Figure 7:
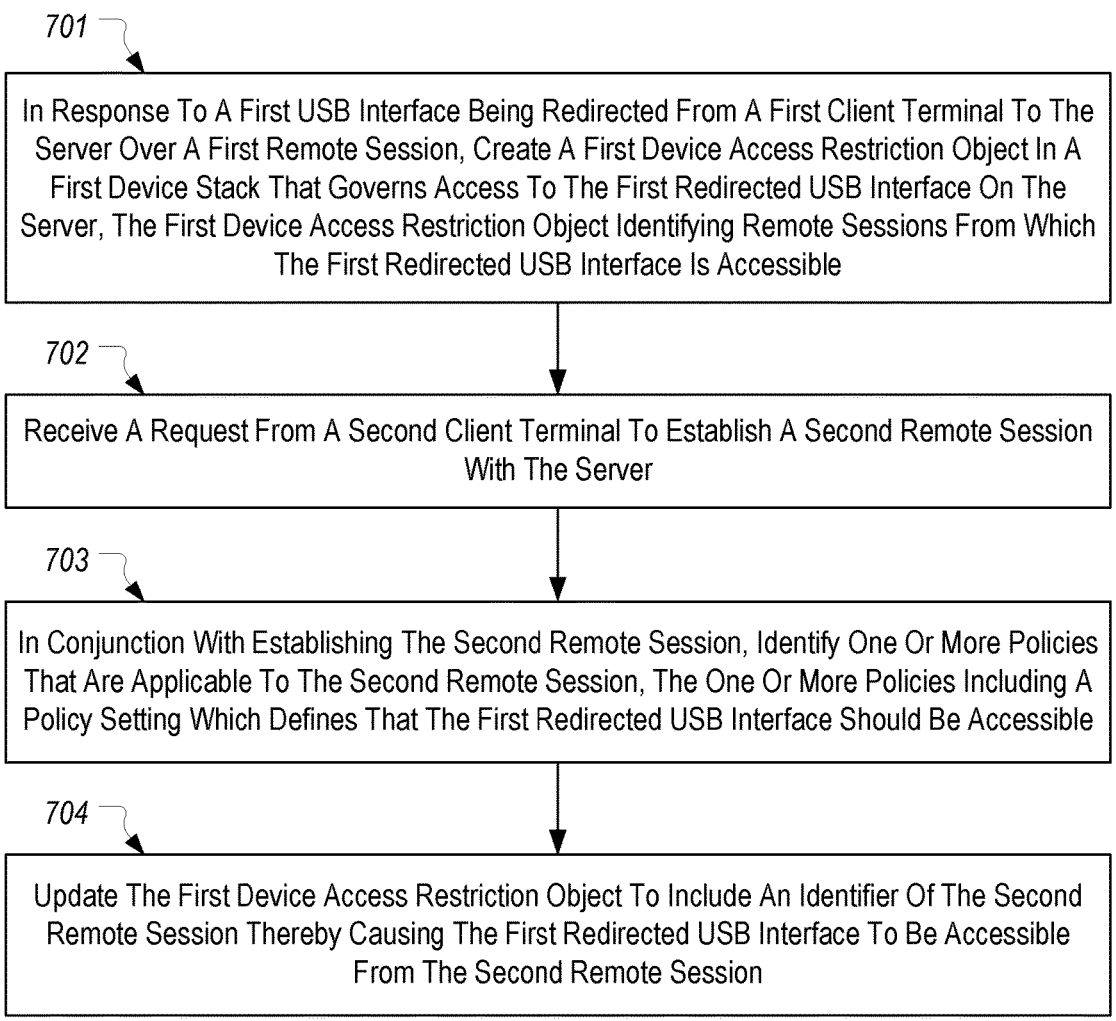
FIG. 7 illustrates a flowchart of an example method for controlling from which remote sessions a redirected USB interface will be accessible.

FIG. 7 illustrates a flowchart of an example method 700 for controlling from which remote sessions a redirected USB interface will be accessible. As an example, method 700 can be implemented by server 404.

Method 700 includes an act 701 of, in response to a first USB interface being redirected from a first client terminal to the server over a first remote session, creating a first device access restriction object in a first device stack that governs access to the first redirected USB interface on the server, the first device access restriction object identifying remote sessions from which the first redirected USB interface is accessible. For example, DAR object 492a can be created in device stack 491a which governs access to virtual device 690a corresponding to interface 640a which is redirected over remote session 601.

Method 700 includes an act 702 of receiving a request from a second client terminal to establish a second remote session with the server. For example, clients 102b can request a remote session with server 404.

Method 700 includes an act 703 of, in conjunction with establishing the second remote session, identifying one or more policies that are applicable to the second remote session, the one or more policies including a policy setting which defines that the first redirected USB interface should be accessible. For example, in conjunction with establishing remote session 602, group policy object 510 can be identified as being applicable to remote session 602.

Method 700 includes an act 704 of updating the first device access restriction object to include an identifier of the second remote session thereby causing the first redirected USB interface to be accessible from the second remote session. For example, Session602_ID can be added to list 501a within DAR object 492a so that virtual device 690a can be accessed from within remote session 602.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a server with which a number of client terminals establish remote sessions, for controlling from which remote sessions a redirected USB interface of a USB composite device will be accessible, the method comprising:

in response to a USB composite device having a first USB interface and a second USB interface being redirected from a first client terminal to a server over a first remote session, creating a first device access restriction object in a first device stack that governs access to the first redirected USB interface of the USB composite device on the server, the first device access restriction object identifying remote sessions from which the first redirected USB interface of the USB composite device is accessible, and creating a second device access restriction object in a second device stack that governs access to the second redirected USB interface of the USB composite device on the server, the second device access restriction object identifying remote sessions from which the second redirected USB interface of the USB composite device is accessible;

receiving a request from a second client terminal to establish a second remote session with the server;

in conjunction with establishing the second remote session, identifying one or more policies that are applicable to the second remote session, the one or more policies including a policy setting which defines that the first redirected USB interface of the USB composite device should be accessible and a policy setting which defines that the second redirected USB interface of the USB composite device should not be accessible; and updating the first device access restriction object but not the second device access restriction object to include an identifier of the second remote session thereby causing the first redirected USB interface of the USB composite device to be accessible from the second remote session while preventing the second redirected USB interface of the USB composite device from being accessible from the second remote session.

2. The method of claim 1, wherein the first USB interface of the USB composite device is a printer interface and the second USB interface of the USB composite device is a scanner interface.

3. The method of claim 1, wherein the first redirected USB interface of the USB composite device is associated with a first interface class code and the policy setting defines that USB interfaces associated with the first interface class code should be accessible.

4. The method of claim 3, wherein the first redirected USB interface of the USB composite device is also associated with a first interface subclass code and the policy setting defines that USB interfaces associated with the first interface subclass code should be accessible.

5. The method of claim 1, further comprising:
receiving, at the first device access restriction object, a request to access the first redirected USB interface of the USB composite device, the request being associated with the identifier of the second remote session;
determining that the first device access restriction object includes the identifier of the second remote session; and
allowing the request.

6. The method of claim 1, further comprising:
receiving, at the first device access restriction object, a request to access the first redirected USB interface of the USB composite device, the request being associated with an identifier of another remote session;
determining that the first device access restriction object does not include the identifier of other remote session; and
blocking the request.

7. The method of claim 1, further comprising:
for each session identified in the first device access restriction object, adding a symbolic link to the first redirected USB interface of the USB composite device to a local object manager namespace of the session.

8. The method of claim 7, further comprising one of:
removing a symbolic link to the first redirected USB interface of the USB composite device from a global object manager namespace; or
preventing a symbolic link to the first redirected USB interface of the USB composite device from being added to a global object manager namespace.

9. The method of claim 1, further comprising:
detecting that the second remote session has been terminated; and
removing the identifier of the second remote session from the first device access restriction object.

10. The method of claim 1, wherein the one or more policies comprise one or more Active Directory group policy objects.

11. One or more non-transitory computer storage media storing computer executable instructions which when executed on a server implement a method for controlling from which remote sessions a redirected USB interface will be accessible, the method comprising:
detecting that a USB composite device has been connected to a first client terminal that has established a first remote session with the server, the USB composite device having at least a first USB interface and a second USB interface;
redirecting the first USB interface and the second USB interface to the server by creating a first device access restriction object in a first device stack that governs access to the first redirected USB interface of the USB composite device on the server, the first device access restriction object identifying remote sessions from which the first redirected USB interface of the USB composite device is accessible, and creating a second device access restriction object in a second device stack that governs access to the second redirected USB interface of the USB composite device on the server, the second device access restriction object identifying remote sessions from which the second redirected USB interface of the USB composite device is accessible;
in response to a second client terminal establishing a second remote session with the server and based on a policy setting of a policy applicable to the second remote session, updating the first device access restriction objects to include an identifier of the second remote session thereby allowing the first redirected USB interface of the USB composite device to be accessed from the second remote session in accordance with the policy setting, but not updating the second device access restriction object to include the identifier of the second remote session thereby preventing the second redirected USB interface of the USB composite device from being accessed from the second remote session in accordance with the policy setting.

12. The computer storage media of claim 11, wherein the policy comprises an Active Directory group policy object.

13. The computer storage media of claim 11, wherein the method further comprises:
adding a symbolic link to the first redirected USB interface of the USB composite device to a local object manager namespace of the second remote session; and
either removing a symbolic link to the first redirected USB interface of the USB composite device from a global object manager namespace or preventing a symbolic link to the first redirected USB interface of the USB composite device from being added to the global object manager namespace.

14. The computer storage media of claim 11, wherein the method further comprises:
detecting that the second remote session has terminated; and
removing the identifier of the second remote session from the first device access restriction object.

15. A method, implemented by a server with which a number of client terminals establish remote sessions, for controlling from which remote sessions a redirected USB interface of a USB composite device will be accessible, the method comprising:
in response to a USB composite device having a first USB interface and a second USB interface being redirected from a first client terminal to a server over a first remote session, independently restricting access to the first and second USB interfaces of the USB composite device by creating a first device access restriction object in a first device stack that governs access to the first redirected USB interface of the USB composite device on the server and creating a second device access restriction object in a second device stack that governs access to the second redirected USB interface of the USB composite device on the server;

receiving a request from a second client terminal to establish a second remote session with the server;

in conjunction with establishing the second remote session, identifying one or more policies that are applicable to the second remote session, the one or more policies including a policy setting which defines that the first redirected USB interface of the USB composite device should be accessible and a policy setting which defines that the second redirected USB interface of the USB composite device should not be accessible; and dynamically applying the one or more policies to selectively define access to the first and second USB interface of the USB composite device from the second remote session by updating the first device access restriction object but not the second device access restriction object to include an identifier of the second remote session thereby causing the first redirected USB interface of the USB composite device to be accessible from the second remote session while preventing the second redirected USB interface of the USB composite device from being accessible from the second remote session.

16. The method of claim 15, wherein the first redirected USB interface of the USB composite device is associated with a first interface class code and the policy setting defines that USB interfaces associated with the first interface class code should be accessible.

17. The method of claim 16, wherein the first redirected USB interface of the USB composite device is also associated with a first interface subclass code and the policy setting defines that USB interfaces associated with the first interface subclass code should be accessible.

18. The method of claim 15, further comprising:
detecting that the second remote session has been terminated; and
removing the identifier of the second remote session from the first device access restriction object.

19. The method of claim 15, wherein the one or more policies comprise one or more Active Directory group policy objects.

20. The computer storage media of claim 11, wherein the method further comprises:
in response to a third client terminal establishing a third remote session with the server and based on a second policy setting of a policy applicable to the third remote session, updating the second device access restriction object to include an identifier of the third remote session thereby allowing the second redirected USB interface of the USB composite device to be accessed from the third remote session in accordance with the second policy setting, but not updating the first device access restriction object to include the identifier of the third remote session thereby preventing the first redirected USB interface of the USB composite device from being accessed from the third remote session in accordance with the second policy setting.

* * * * *